United States Patent [19]

Lewis et al.

[11] Patent Number: 5,723,167
[45] Date of Patent: Mar. 3, 1998

[54] COMPRESSED FROZEN VEGETABLES AND PROCESS OF MAKING

[75] Inventors: Victor Marcus Lewis, Neutral Bay; David Adrian Lewis, Burraneer, both of Australia

[73] Assignee: Byron Agricultural Company PTy Ltd., Ruschcutters Bay, Australia

[21] Appl. No.: 575,158

[22] Filed: Dec. 19, 1995

[30] Foreign Application Priority Data

Dec. 21, 1994 [AU] Australia ................................. PN0202

[51] Int. Cl.$^6$ ........................................... A23L 3/40
[52] U.S. Cl. ........................ 426/640; 426/524; 426/615
[58] Field of Search ............................... 426/640, 615, 426/524

[56] References Cited

U.S. PATENT DOCUMENTS

| | | |
|---|---|---|
| 2,382,780 | 8/1945 | Donnelly . |
| 3,408,209 | 10/1968 | Eskew et al. . |
| 3,705,814 | 12/1972 | Rahman et al. . |
| 3,806,610 | 4/1974 | Rahman . |
| 3,882,252 | 5/1975 | Schafer et al. . |
| 3,950,560 | 4/1976 | Rahman et al. . |
| 3,984,577 | 10/1976 | Rahman . |
| 4,096,283 | 6/1978 | Rahman . |
| 4,109,026 | 8/1978 | Rahman et al. . |
| 4,683,141 | 7/1987 | Lewis et al. ............................. 426/640 |
| 5,480,672 | 1/1996 | Kusano et al. .......................... 426/640 |

FOREIGN PATENT DOCUMENTS

| | | |
|---|---|---|
| 0326525 | 2/1989 | Australia . |
| 622225 | 4/1990 | Australia . |
| 13993 | 10/1992 | Australia . |
| 32822 | 2/1993 | Australia . |
| 0481923 | 4/1992 | European Pat. Off. . |

OTHER PUBLICATIONS

Grove, P. Webster's Third New International Dictionary, G & C Merriam, Co., Springfield, Mass., p. 869, 1971.
Woodroof, et al. Commercial Fruit Processing, Avi Publishing Co., Inc. Westport, Connecticut, pp. 410, 411, 1975.

*Primary Examiner*—Helen Pratt
*Attorney, Agent, or Firm*—Scully, Scott, Murphy & Presser

[57] ABSTRACT

The present invention is directed to a process of preparing and/or preserving a partially dehydrated vegetable which is capable of being preserved at or about freezer temperatures, and the product produced thereby.

26 Claims, No Drawings

COMPRESSED FROZEN VEGETABLES AND PROCESS OF MAKING

FIELD OF THE INVENTION

The present invention relates to partially dehydrated vegetables that are compressed to minimize storage space and are stored at freezer temperatures.

BACKGROUND OF THE INVENTION

Frozen vegetables are important articles of commerce, being used as consumer items, industrial raw materials and in food service. Most vegetables must be held in freezer storage for many months. Production of frozen vegetables occurs usually at a long distance from the point of consumption. There is a considerable world trade in frozen vegetable items and this necessitates long and costly transport by road, ship or aircraft. One of the main problems associated with the frozen food industry is the high cost of frozen storage and transport. The energy cost of freezing vegetables is also considerable.

The common form in which frozen vegetables are produced is as individually quick frozen (IQF) products. With IQF products, the prepared pieces of vegetable are frozen in a low temperature fast moving air stream resulting in individual pieces which are separate and more or less free flowing. This offers convenience in use in that the vegetables can be readily removed from the package, but the air space between the vegetable pieces is considerable and the storage space required is likewise large. Methods have been described which reduce the storage space of frozen vegetables by dehydrofreezing. In such a process, vegetables are dehydrated to as much as about 50% of their original weight (Lazar, ME-1968 "Dehydrofreezing of fruits and vegetables, in Freezing Preservation of Foods—45th Ed. Vol. 3 P347 AVI Publishing Co.) and thereafter frozen. Dehydrofreezing can reduce freezing, packing, storage and transport costs by up to 60%.

The compression of vegetables has been described by Ishler 1965 (Methods of Controlling Fragmentation of dried foods during compression, Technical Report D-13, U.S. Army Natick Laboratories, Natick, Mass.) Constanza et al 1992 (EP 0481923A1), Rahman 1978 (U.S. Pat. No. 4,096, 283), Rahman 1976 (U.S. Pat. No. 3,950,560 and U.S. Pat. No. 3,984,577) and others. Most of the work in the field of compression of vegetables has been directed towards compression of freeze-dried products at pressures of 200–400 lb/in$^2$ to form a compacted form of dry vegetables at low moisture content for army ration purposes.

A method of partial dehydration has been described whereby vegetables are dehydrated with the addition of solutes so that a product is produced that does not freeze at −20° C., and has a lower moisture content than dehydrofrozen vegetables. These products occupy less space than the dehydrofrozen products (Lewis et al, Aust. Pat 622225, 1989).

SUMMARY OF THE INVENTION

The present invention relates to a process of preparing compressed partially dehydrated vegetables having a water activity of 0.90 or lower whereby the vegetables are essentially dry to the touch but still flexible and subsequently compressing said vegetables so as to leave only a minimal space between the vegetables to form the vegetables into a substantially solid block and packaging said vegetables either before or after compressing said vegetables and reducing the temperature of this product to freezer temperatures. They remain unfrozen at this temperature. The present invention also relates to a process of preserving a vegetable product by dehydrating the vegetable to a moisture content of about 15% to about 60% (w/w) to produce a product having a water activity of 0.90 or less, compressing the dehydrated product to substantially remove all of the air and reducing the temperature of the dehydrated compressed product to a range ranging from about 8° C. to about −30° C.

Water activity controlling solutes or adjuvants such as flavourlugs, seasonings, colouring agents and preservatives and the like may be added to the vegetables either before or after dehydration and preferably the dehydrated vegetables are packaged in a flexible container and compressed by subjecting the vegetables to a vacuum so that most of the air is removed from the package which is thereafter sealed.

The invention also encompasses compressed partially dehydrated vegetables which are prepared in accordance with such process.

The present invention is an advance in the art of preserving, storing and transporting vegetables. Products prepared in accordance with this invention can occupy as little as 4% of the space occupied by known IQF vegetables. In use, the vegetables are re-hydrated in a few minutes and are of an excellent quality savings in frozen storage and transport costs more than cover the costs involved in dehydration.

DETAILED DESCRIPTION OF THE INVENTION

It has been found that by dehydrating the vegetable product or pieces thereof to a moisture level of about 15% to about 60% (w/w) and a water activity of 0.90 or below, followed by compressing the product so as to remove most of the air (and oxygen) therefrom and reducing the temperature of the product to about freezer temperatures produces a product which occupies substantially less space than conventional frozen vegetables and has a longer shelf life than conventional frozen vegetables. Yet, when rehydrated, the vegetable products are generally better tasting and have a better texture than that of conventional frozen vegetables. These products have tremendous advantages in that they are more stable and easier to store and transport, as a result of their smaller size. Most importantly, they generally provide a better vegetable product than conventional frozen vegetables.

The vegetable products described herein may contain one type of vegetable, such as corn, lima beans, broccoli, cauliflower, peas, carrots or they can be an admixture of vegetables, such as peas and carrots, corn and lima beans, etc. The product typically consists of more than one individual piece of vegetable, i.e., it usually contains a plurality of pieces.

The term "freezer", frozen", or variation thereof as used herein is meant to convey a state where ice and/or solute crystals are normally formed in a product, making it hard and/or brittle.

The term "vegetable" as used herein denotes various types of vegetables, but are not limited to leaves, petioles, roots, bulbs, corms, tubers, etc., as well as fruits and seeds. Examples include, but are not limited to, tomatoes, squash, pumpkin, beans, broccoli, green beans, asparagus, peas, corn, carrots, spinach, cauliflower, lima beans, cabbage, onions, zucchini, eggplant, sweet basil, leeks and the like. In this description, whenever the word vegetable appears, it is to be understood as indicating either whole vegetable or vegetable pieces or morsels. Moreover, the terms "vegetable" and "vegetables" refer to both the singular as well as to the plural.

By use of the terms "freezer temperatures", it is meant temperatures that are typically used in freezers. Temperatures preferably range from about 0° C. to about −40° C. The term "refrigerator temperatures" is meant to convey normal refrigerator temperatures, such as from about 2° C. to about 8° C.

Water activity is a measurement of the amount of water available for chemical reactions in foods, e.g., microbiological spoilage, hydration of colloids, enzyme activity, and the like. It is a measurement of the free water available for chemical reactions. A higher value of water activity signifies that a higher amount of free water is available relative to a lower value. Obviously, the water activity is related to the amount of water present in the foods, but the relationship is quite complex and non-linear. The expression "$a_w$" is used to describe water activity by the formula $$a_w = p/po$$

where p is the vapor pressure of the food and po is the vapor pressure of water at the same temperature. The water activity is dependent upon several factors, such as the amount and types of solids present in the food and the interaction of the solids with the water. Thus, even if two foods contain the same moisture content, the water activity would be different if the solid compositions of the foods are different.

The term "solutes", as used herein, refers to the water activity controlling solutes, as defined hereinbelow.

As used herein, the singular denotes the plural and vice/versa.

In the present invention, it is important to maintain the water activity below a certain level. For example, bacteria grows on food having water activity greater than 0.9. Thus, the water activity of the vegetable products of the present invention must be less than or equal to 0.9.

The vegetable product of the present invention is produced by dehydration followed by compression thereof. The vegetables prior to dehydration may be peeled, cut, blanched or otherwise prepared in accordance with any customary procedure. The present invention involves dehydrating prepared vegetables or vegetable pieces or morsels which have optionally been treated with a water activity controlling solute, to a degree where the water activity of the products is 0.90 or lower and preferably below about 0.85 and most preferably between about 0.7 and about 0.85.

The dehydration step removes sufficient amount of water to form a vegetable product that will not crystallize or freeze at freezer temperature and produces a product which is flexible and non-fragile and essentially dry to the touch. If the moisture content is too low, the vegetable product will become hard, fragile and brittle at freezing temperatures. If the moisture content is too high, the vegetable pieces will freeze hard due to the formation of ice crystals; the cell structure of the vegetable will be damaged and the vegetable will become fragile. It is preferred that the moisture content will typically be in the range of about 15% to about 60% (w/w) and more preferably between about 20% to about 40% (w/w).

The dehydration of the vegetable or vegetable pieces is effected by conventional techniques. The drying may be effected by hot air-drying, vacuum oven drying or freeze-vacuum dehydration or other conventional techniques. Air drying is preferred, and it can be carried out in various types of air-drying equipment. The temperatures used are those that effectively dehydrate the product, for example, about 100° F. to about 180° F.

The degree of dehydration and the concentration of solutes, if present, is adjusted to give a water activity after the dehydration step below 0.90, preferably below 0.85 and a moisture content of about 15% to about 60%, preferably about 20% to about 40%.

The vegetables in this flexible state are then compressed. The vegetables (i.e., various items, pieces or morsels) are compressed so as to remove substantially all of the air from the air spaces therebetween. The compression is preferably continued until a substantially solid block containing the vegetables is formed. In a preferred embodiment, about 85% or more of the air is removed from the air spaces. In an even more preferred embodiment, about 95% or more of the air is removed from the air spaces. In the most preferred embodiment there are no air spaces between the pieces of vegetable. The compression of the vegetables is effected by mechanical means, e.g. a cylinder and ram arrangement or press into a substantially solid block. Alternatively, the vegetables are placed in a flexible package and subjected to a vacuum so that most of the air is removed from the package which is then sealed. The latter method is a preferred embodiment. In an even more preferred embodiment, at least 85% of the air is removed. In an even more preferred embodiment, at least 95% of the air is removed. Nevertheless, any of the compression methods described herein produces a pack of vegetables in the form of a solid block with substantially no air spaces between the vegetable pieces. When treated in this way, the dehydrated vegetables occupy significantly less space than that of conventional individually quick frozen vegetables, i.e., from about 4% to about 20% of the volume of conventional frozen vegetable. Table 1 gives the relative volumes of 1 kg of some typical IQF vegetables, their equivalent in partially dehydrated but still flexible dehydrated vegetables dehydrated to about 30% moisture and the volume of this dehydrated vegetable when compressed by vacuum packaging.

TABLE 1

| Product | Volume of 1 kg IQF Product | Volume of Dehydrated Product | Volume of Compressed Product of Present invention | % of space occupied by compressed Product of present invention compared with IQF |
|---|---|---|---|---|
| sliced beans | 2,500 ml | 770 ml | 207 ml | 8.3% |
| diced cabbage | 3,000 ml | 500 ml | 117 ml | 3.9% |
| corn kernels | 2,000 ml | 700 ml | 400 ml | 20.0% |

TABLE 1-continued

| Product | Volume of 1 kg IQF Product | Volume of Dehydrated Product | Volume of Compressed Product of Present invention | % of space occupied by compressed Product of present invention compared with IQF |
|---|---|---|---|---|
| peas | 1,800 ml | 750 ml | 360 ml | 20.0% |
| shredded carrots | 3,160 ml | 760 ml | 142 ml | 4.5% |

This methodology described hereinabove results in the substantial elimination of oxygen from the products. In addition, it protects the products from mold and yeast when stored at higher temperatures since they cannot propagate in a substantially oxygen-free environment. In a preferred embodiment, water activity controlling solutes are introduced into the product prior to the compression steps or the removal of oxygen by vacuum. They substantially reduce the water activity of the dried product, permitting even greater microbiologically stable intermediate moisture food products to be prepared for storage at freezer temperatures. These products, at a water activity below 0.90, and preferably below about 0.85, are quite flexible at ambient temperatures and essentially remain so at freezer temperature. They are microbiologically stable at ambient temperatures for prolonged periods, especially when packaged to remove air, as, for example, when vacuum packaged.

These vegetable products so produced are stable at freezer temperatures and can be stored for prolonged periods of time relative to IQF products. They may be stored at temperatures ranging from about 0° C. to about −40° C., although it is preferred that they be stored at temperatures ranging from about 0° to about −30° C. and more preferably from about −15° C. to about −20° C.

Water activity controlling solutes, such as salts, may naturally be present in the vegetable. However, in a preferred embodiment, water activity controlling solutes are added to the vegetable product. The water activity controlling solutes are those normally used in the food arts to control water activity. The preferred solutes are salts, sugars and polyhydric alcohols.

The preferred salts are the edible salts and include sodium chloride, sodium citrate, sodium lactate, potassium lactate, potassium chloride, potassium citrate and the like.

The sugars include the common monosaccharides and the disaccharides. Examples are fructose, sucrose, dextrose, maltose, lactose and high conversion corn syrups, such as corn syrup solids, invert sugars, high fructose corn syrup (>55% fructose content, preferably about 90% fructose content) and the like. The preferred sugars are lactose, dextrose and maltose.

Other water activity controlling solutes include polyhydric alcohols. Preferred polyhydric alcohols are the sugar alcohols, especially the polydextrose sugar alcohols. Examples of polyhydric alcohols include, sorbitol, mannitol, xylitol, glycols such as glycerol, lower alkylene glycols containing 3–6 carbon atoms, such as propylene glycol and the like.

These water activity controlling solutes may be used singly or in admixture with other water activity controlling solutes described herein. When present they are preferably present in amounts ranging up to about 10% by weight and more preferably about 2 to about 6% (w/w).

These products of the present invention rehydrate very rapidly because they are at a relatively high moisture content. Furthermore, when present, the solutes induce the rapid absorption of water into the vegetable tissue. These products, because of their low water activity, low concentration of oxygen and, if present, high concentration of natural and/or added solutes are remarkably stable at low temperatures. Bacterial growth and mould growth are inhibited. At refrigeration temperatures (e.g., 2° C. to 8° C.) they have a shelf-life of several months and at freezer temperatures have a shelf-life of one to three years. Because of their lower water activity, they resist dehydration (freezer-burn) and retain colour and flavour extremely well. The product can also be reduced to freezer temperatures, such as −20° C., without freezing, thus eliminating the formation of ice crystals which damage the structure of the vegetables. Cost of reduction of temperature to freezer temperatures is also reduced because ice is not produced. Since the products do not freeze, there is no risk of thawing.

The vegetable products of the present invention may additionally be admixed with adjuvants, such as flavouring agents, emulsifiers, coloring agents, preservatives, seasonings and the like. Examples of seasoning agents include sodium citrate, citric acid, and the like. Other adjuvants include emulsifiers and stabilizers such as guar gum, lecithin, carrageenan, furcelleran, pectin, gellan, methyl cellulose, hydroxypropyl methyl cellulose, locust bean, tragacanth, xanthan, sodium carboxy-methylcellulose, and the like. Other adjuvants include food acid flavorings and flavor enhancers (such as monosodium glutamate, 5'-ribonucleotides (such as 5'-inosine monophosphate) and 2-methyl-3-hydroxy-4-(4H-pyrone), and the like), preservatives, coloring agents, seasonings, such as the salts enumerated hereinbelow, and the like.

The water activity controlling solutes and/or adjuvants may be added to the vegetables before, during or after the vegetable pieces are dehydrated by any conventional method. For example, the vegetables may be pre-steeped in solute solution, dry powdered solutes may be dusted onto the vegetables just prior to or during the early stages of dehydration or solute solution may be added to the vegetables during or after dehydration, or by any other method used in this art.

Sugars may be added in low concentrations as flavourings, and other flavourings and seasonings may be optionally added. If necessary, preservatives such as sodium sulfite may also be added. The concentration of salts that are added is dependent on such variables as flavour considerations, the nature of the solutes and the types of vegetables being treated. The amount of salts that is added is that which is conventionally used. The maximum level is about 10%, but the usual level is about 2% to about 6%. The preferred solute is sodium chloride and the preferred level in the dehydrated vegetables is about 2% to about 6%. As the vegetables are normally cooked in the ratio of one part of vegetables to 20 parts of water, the solute concentration in the vegetables as eaten is quite low. The addition of solutes is not necessary, as the compressed frozen vegetables can be produced without solute addition at all.

The compressed freezer-stored vegetables may be prepared for use by boiling in water. When a block of the vegetables is immersed in boiling water, the rate of water penetration is surprisingly rapid. Despite the apparent dense nature of the compressed material, the block of vegetables falls apart in an amazingly short time. For most vegetables, this occurs within about a minute. Leafy vegetables such as spinach and cabbage are fully rehydrated and cooked in about two minutes or less and other vegetables such as green peas, sweet corn and sliced beans are rehydrated and cooked in about three to about five minutes. The small block of vegetables produces a surprisingly large mass of cooked product ready to serve in this short time.

A study has been made of the energy costs associated with the production, transport, storage and distribution of frozen vegetables. These total energy costs when applied to a range of IQF vegetables (sliced beans, diced cabbage, julienne carrots, chopped spinach, peas and sweet corn) covering production, long distance freight and storage for twelve months at −20° C. amounted, on average, to 0.85 Australian dollars per kilogram. For the same range of products produced in the compressed dehydrated form as indicated in Table 1, and allowing for the energy cost of dehydration as well as the costs of freight and storage for twelve months at −20° C., as above, gave an average total cost per one kilogram IQF vegetable equivalent of 0.16 Australian dollars. This indicates that the savings in distribution costs on average for the compressed dehydrated product at −20° C. to be of the order of 0.69 Australian dollars per kilogram equivalent. For a frozen vegetable product which may normally sell at retail for $1.00–2.00 per kg, this is a very significant saving.

Additional factors which should be taken into consideration in favour of these compressed dehydrated vegetables over standard IQF vegetables are:

1. Reduced cost of packaging for the compressed vegetables
2. Reduced supermarket, institutional and home freezer storage space required for the compressed product
3. Increased shelf-life over IQF products
4. Immunity from thawing and damage from temperature fluctuations during freezer storage
5. Elimination of freezer-burn in the compressed products
6. Elimination of frost and ice within the compressed vegetable package
7. Should the product increase in temperature above 0° C., the product will not spoil and will present no danger to health. The product can be again reduced to freezer temperature without significant damage.
8. Because the dehydrated vegetables used are flexible and not brittle, cuts of vegetable such as thin slices and long thin julienne strips can be prepared without breaking and will not break as they would do when frozen as IQF products.
9. The vegetables prepared according to this method where the products do not freeze have not been damaged by rupture of the cells by ice crystals, and after rehydration, are accordingly of a better texture than traditional frozen vegetables.

Unless specified to the contrary, the percentages used herein refer to weight percentages.

The invention will now be described with reference to the following non-limiting examples.

EXAMPLES

Examples 1

Cabbage. Savoy variety was cored and diced into 15×15×15 mm dice. The diced cabbage was blanched in steam for two minutes and dehydrated in a hot air dryer initially at 65° C., then at 55° C. until the moisture content was 55%. The cabbage was allowed to equilibrate for about an hour and was then packed in low-oxygen transmission clear laminate bags and vacuum packed and sealed. The cabbage was quite flexible and when vacuum packed formed a solid dense block with no apparent air spaces. The water activity of the cabbage was 0.86. The packed cabbage was stored at −20° C. The cabbage did not freeze but remained flexible.

A 50 g block of compressed cabbage was removed from the freezer and placed in a saucepan with a liter of water. The saucepan was placed on a burner and the water brought to the boil. Before the water had boiled the block of cabbage had almost completely separated into its integral pieces, and on boiling 3 minutes the product was cooked and of excellent crisp texture. The 50 g block cooked to approximately 380 g of cooked cabbage.

Example 2

Carrots. Fresh carrots were peeled and cut into julienne strips 3 mm×4 mm by approximately 70 mm in length. 500 g of carrot strips were blanched in steam for two minutes and allowed to surface dry for a few minutes. The carrot was then tumbled with 23 g of salt, 40 g of sugar and 15 g of sodium citrate until the powdered ingredients had formed a coating on the carrots. The carrots were transferred to the tray of a hot air dryer and dried at 70° C. to a moisture content of 23.7%. The carrot shreds were still quite flexible and had a water activity of 0.71. They contained 3% sodium chloride, 5% of added sugar and 2% of added sodium citrate. The carrots were placed in flexible laminate bags and vacuum packed and sealed. Compact solid packs of carrots were obtained. These were then kept at −20° C. 50 g of carrots was removed from the freezer and was cooked as in Example 1. After two minutes boiling, the carrot shreds had separated and were well cooked. No shreds were broken. The 50 g block of carrots yielded 300 g of cooked shreds.

Example 3

Spinach. 2 kg of fresh spinach was well washed and drained, coarsely chopped into approximately 500 mm×500 mm pieces and dried in a hot air dehydrator at 70° C. to approximately 15% moisture content. At this moisture content the leaves were quite brittle. The spinach was carefully transferred to a slowly rotating drum and sprayed with 46 ml of a saturated sodium chloride brine. The spinach quickly absorbed the brine and became quite flexible. It was vacuum packed in a similar way to the carrots and cabbage and stored at −20° C. The spinach had a salt content of 5%, a moisture content of 33% and a water activity of 0.78. 50 g of the compressed spinach was removed from the freezer and cooked in a similar way to the carrots. The spinach was fully cooked after boiling for one minute and the leaf pieces were separate and essentially unbroken compared to the original cut pieces. The cooked spinach weighed 340 g.

Example 4

Carrots. Carrots were prepared as described in Example 2 except that instead of vacuum packaging, the semi-dried carrots were placed in 100 g batches in a cylinder of 7 cm diameter equipped with a ram and compressed at 50 kg per cm². The block of carrots so formed was cooked in 20 times its weight of water. After 2 minutes boiling the carrot shreds were completely separate and well cooked.

Example 5

Sweet Corn. Sweet corn kernels of a super-sweet variety were cut from the cob, steam blanched for three minutes and dehydrated in a hot air dryer at 70° C. until the moisture content of the kernels was 25%. The water activity of the dehydratd corn was 0.84. At this moisture content, the corn was dry to the touch but "rubbery" in texture. The corn was vacuum packed, 50 g to a pouch made from low oxygen transmission flexible film, sealed and stored at −20° C. A 50 g pack of corn was later removed from the freezer and cooked in 300 ml of boiling water. The compressed corn had separated into the individual kernels within a minute of immersion and was well cooked in five minutes.

The above preferred embodiments and examples are given to illustrate the scope and spirit of the present invention. The embodiments and examples described herein will make apparent to those skilled in the art other embodiments and example. These other embodiments and examples are within the contemplation of the present invention. Therefore, the present invention should be limited only by the appended claims.

What is claimed is:

1. A process for preparing a low-temperature stable vegetable product comprising a plurality of vegetable pieces, said process consisting essentially of (a) dehydrating said vegetable product to a moisture content between about 15% and about 60% (w/w) to obtain a dehydrated vegetable product having a water activity at or below 0.90 measured at 20° C., (b) compressing the dehydrated vegetable product to substantially remove all of the air between the spaces of the pieces to produce a dehydrated compressed vegetable product which will not freeze at freezer temperatures and (c) reducing the temperature of said compressed dehydrated product to freezer temperatures.

2. The process according to claim 1 in which compressing in step (b) comprises placing the dehydrated product in a vacuum to remove most of the air therefrom.

3. The process according to claim 1 in which the temperature is reduced to a temperature ranging from about 0° C. to about −20° C.

4. The process according to claim 1 wherein the water activity of the vegetable product is below 0.85.

5. The process according to claim 1 in which the moisture content of the vegetable product ranges from about 20% to about 40% (w/w).

6. The process according to claim 1 in which the dehydrated product is flexible and essentially dry to the touch.

7. A low-temperature stable vegetable product comprising edible pieces thereof prepared in accordance with claim 1, wherein said vegetable product has a moisture content of about 15% to about 60% (w/w), has a water activity below about. 0.90, has been compressed to remove substantially all of the air from the spaces between said pieces, and will not freeze when stored at freezer temperatures.

8. The vegetable product according to claim 7 wherein the water activity is below 0.85.

9. The vegetable product according to claim 7 which additionally comprises a water activity controlling solute.

10. The vegetable product according to claim 9 wherein the water activity controlling solute is an edible salt, sugar, polyhydric alcohol or mixture thereof.

11. The vegetable product according to claim 10 wherein the water activity controlling solute is sodium chloride, sodium citrate, sodium lactate, potassium lactate, potassium chloride, potassium citrate, sucrose, dextrose, invert sugar, glycerol, sorbitol, propylene glycol or mixtures thereof.

12. The vegetable product according to claim 9 wherein an adjuvant is additionally present.

13. The vegetable product according to claim 7 wherein an adjuvant is additionally present.

14. The vegetable product according to claim 7 subjected to a vacuum to remove most of the air.

15. The vegetable product according to claim 7 wherein the moisture content of the vegetable product ranges from about 20% to about 40% (w/w).

16. A process for preparing a low-temperature stable vegetable product comprising a plurality of vegetable pieces, said process consisting essentially of (a) dehydrating said vegetable product to a moisture content between about 15% and about 60% (w/w) to obtain a dehydrated vegetable product having a water activity at or below 0.90 measured at 20° C., (b) admixing a water activity controlling solute with the vegetable product prior to, simultaneously with or subsequent to the dehydration step, but prior to compressing the dehydrated product in step (c), (c) compressing the dehydrated vegetable product to substantially remove all of the air between the spaces of the pieces to produce a dehydrated compressed vegetable product which will not freeze at freezer temperatures and (d) reducing the temperature of said compressed dehydrated product to freezer temperatures.

17. The process according to claim 16 in which the water activity controlling solute is a salt, sugar, polyhydric alcohol or mixture thereof.

18. The process according to claim 17 in which the water activity controlling solute is sodium chloride, sodium citrate, sodium lactate, potassium lactate, potassium chloride, potassium citrate, sucrose, dextrose, invert sugar, glycerol, sorbitol, propylene glycol or mixtures thereof.

19. A process for preparing a low-temperature stable vegetable product comprising a plurality of vegetable pieces, said process consisting essentially of (a) dehydrating said vegetable product to a moisture content between about 15% and about 60% (w/w) to obtain a dehydrated vegetable product having a water activity at or below 0.90 measured at 20° C., (b) admixing adjuvants with the vegetable product prior to simultaneously with or subsequent to the dehydration step, but prior to compressing the dehydrated vegetable product in step (c), (c) compressing the dehydrated vegetable product to substantially remove all of the air between the spaces of the pieces to produce a dehydrated compressed vegetable product which will not freeze at freezer temperatures and (d) reducing the temperature of said compressed dehydrated product to freezer temperatures.

20. The process for preparing a low-temperature stable vegetable product comprising a plurality of vegetable pieces, said process consisting essentially of (a) dehydrating said vegetable product to a moisture content between about 15% and about 60% (w/w) to obtain a dehydrated vegetable product having a water activity at or below 0.90 measured at 20° C., (b) compressing the dehydrated vegetable product to substantially remove all of the air between the spaces of the pieces to product a dehydrated compressed vegetable product which will not freeze at freezer temperatures, (c) reducing the temperature of said compressed dehydrated product to freezer temperatures, and (d) rehydrating the product of step (c).

21. A process for preserving a low temperature stable vegetable product comprising a plurality of pieces, said process consisting essentially of (a) dehydrating the vegetable product to a moisture content ranging from about 15% to about 60% (w/w) to produce a dehydrated product that has a water activity less than or equal to 0.90 (b) compressing the product of step (a) to substantially remove all of the air in the spaces between each piece to produce a dehydrated compressed vegetable product which will not freeze at freezer temperatures and (c) reducing the temperature of said vegetable product to temperatures ranging from about 8° C. to about −30° C.

22. The process according to claim 21 in which the moisture content of the vegetable product ranges from about 20% to about 40% (w/w).

23. The process according to claim 21 wherein the compressing step comprises placing the dehydrated product in a vacuum to remove most of the air therefrom.

24. The process according to claim 21 wherein the water activity is below 0.85.

25. A process for preserving a low temperatures stable vegetable product comprising a plurality of pieces, said process consisting essentially of dehydrating the vegetable product to a moisture content ranging from about 15% to about 60% (w/w) to produce a dehydrated product that has a water activity less than or equal to 0.90 (b) admixing a water activity controlling solute with the vegetable product prior to, simultaneous with or subsequent to the dehydration step but prior to compressing the dehydrated product in step (c), (c) compressing the dehydrated product of step (b) to substantially remove all of the air in the spaces between each piece to produce a dehydrated compressed vegetable product which will not freeze at freezer temperatures and (d) reducing the temperature of said vegetable product to temperature ranging from about 8° C. to about −30° C.

26. The process according to claim 25 in which the water activity controlling solute is a edible salt, sugar or polyhydric alcohol or mixture thereof.

* * * * *